United States Patent Office 2,950,566
Patented Aug. 30, 1960

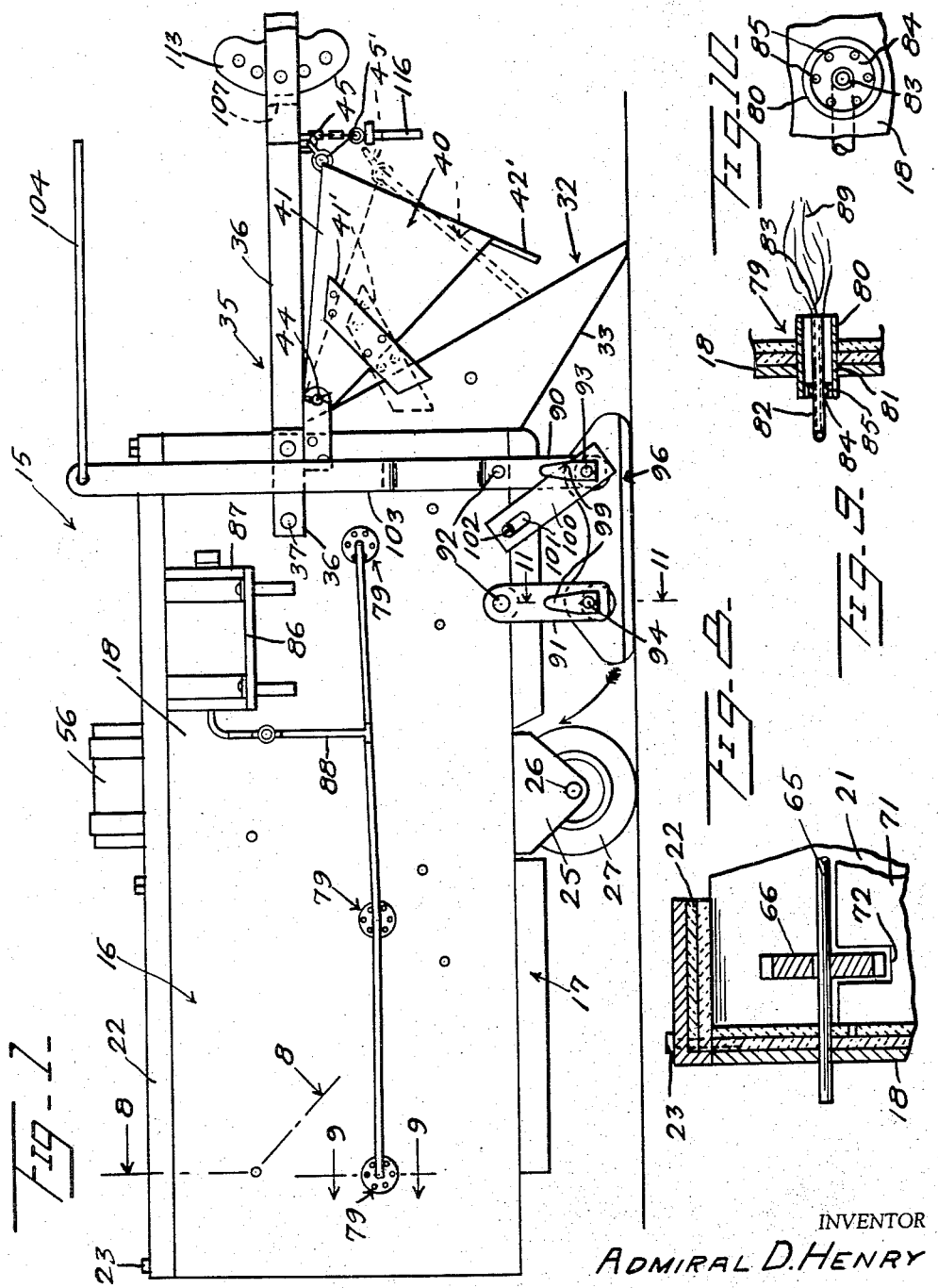

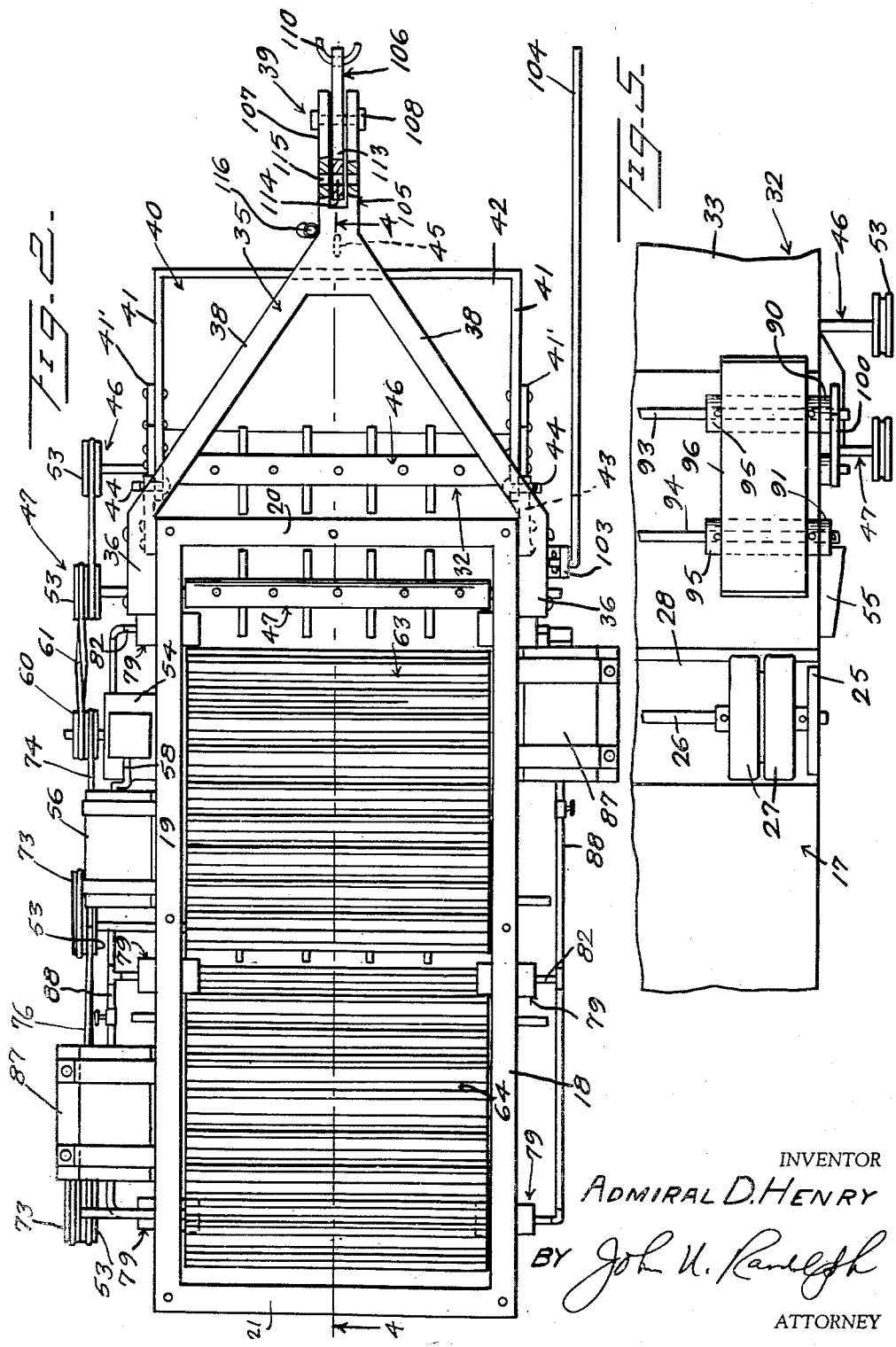

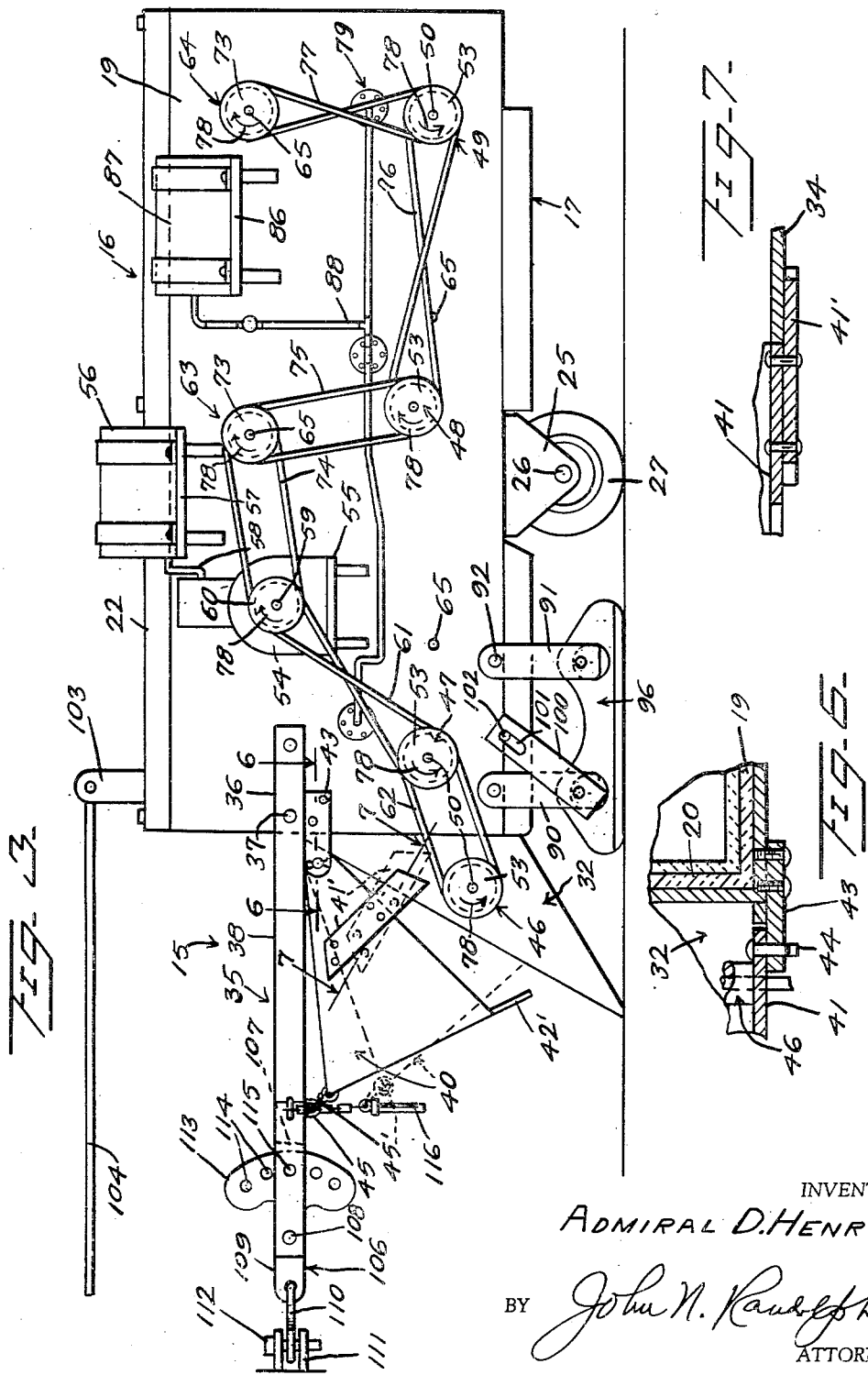

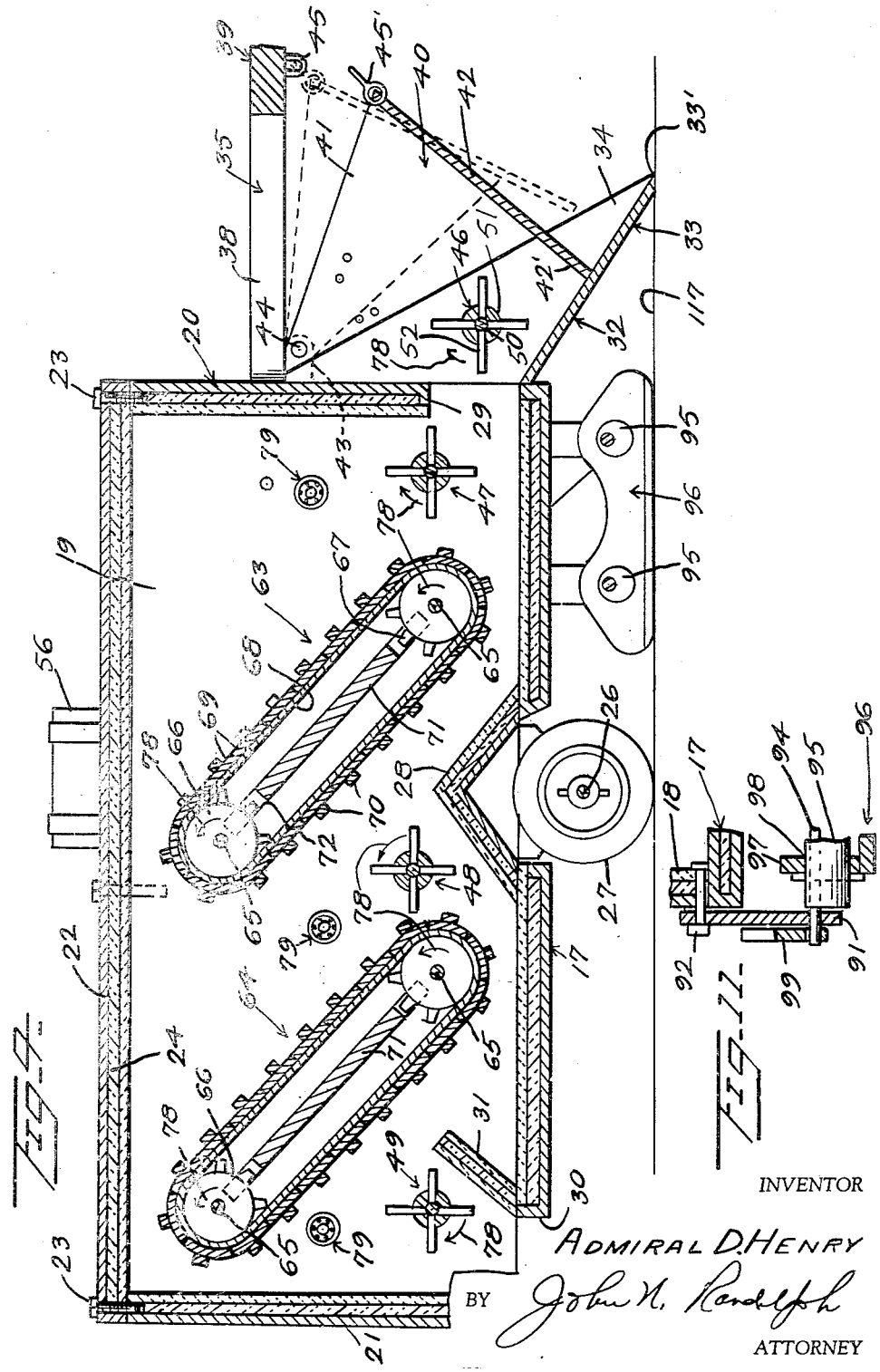

2,950,566

SOIL TREATING MACHINE

Admiral D. Henry, 8108 Cantrell Road, Little Rock, Ark.

Filed Oct. 5, 1959, Ser. No. 844,477

11 Claims. (Cl. 47—1)

This invention relates to a machine capable of operating in a fixed position or which may be attached to and drawn behind a draft vehicle such as a tractor, and through which soil is conveyed for destroying bugs, insects and germs in the soil and in vegetation mixed with the soil, as well as the dead vegetation.

More particularly, it is an aim of the present invention to provide a machine which can be drawn through a field after a crop has been harvested for scooping up the earth to a desired depth and for causing the scooped up earth to pass from end-to-end through the machine and be pulverized and separated during such travel so that dead vegetation, insects and bugs contained therein and the eggs thereof can be destroyed, after which the pulverized soil, free of the vegetation, bugs, germs and the like, is discharged back onto the ground at the rear end of the machine.

A further object of the invention is to provide a machine including, in addition to the means for conveying and loosening the soil, a plurality of burners by which jets of flame are emitted across the path of movement of the soil and vegetation and by which bugs, germs and insects, carried by the soil are destroyed, as well as those which are in the vegetation and which are killed by the vegetation being consumed.

A further object of the invention is to provide novel means for varying the operating depth of the machine when it is pulled behind a draft vehicle.

Still another object of the invention is to provide novel means whereby the machine may be used in a stationary position for accomplishing the aforedescribed results.

Various other objects and advantages of the invention will hereinafter become more fully apparent from the following description of the drawings, illustrating a presently preferred embodiment thereof, and wherein:

Figure 1 is a side elevational view of the machine, looking toward the right-hand side thereof;

Figure 2 is a top plan view of the machine with the cover or top wall removed;

Figure 3 is a side elevational view looking toward the left-hand side of the machine;

Figure 4 is a somewhat enlarged longitudinal sectional view taken substantially along a plane as indicated by the line 4—4 of Figure 2, with parts of the machine broken away;

Figure 5 is a fragmentary bottom plan view of a part of the machine;

Figure 6 is an enlarged fragmentary horizontal sectional view, taken substantially along a plane as indicated by the line 6—6 of Figure 3;

Figure 7 is an enlarged fragmentary sectional view taken along a plane as indicated by the line 7—7 of Figure 3;

Figure 8 is an enlarged fragmentary transverse sectional view taken along the line 8—8 of Figure 1;

Figure 9 is an enlarged fragmentary transverse vertical sectional view, taken along a plane as indicated by the line 9—9 of Figure 1;

Figure 10 is an enlarged fragmentary elevational view looking from right to left of Figure 9, and Figure 11 is an enlarged fragmentary transverse vertical sectional view, taken substantially along a plane as indicated by the line 11—11 of Figure 1.

Referring more specifically to the drawings, the soil treating machine in its entirety is designated generally 15 and includes an elongated body 16 having a bottom, designated generally 17, side walls 18 and 19, a front end wall 20, a rear end wall 21 and a top wall 22. The top wall 22 is detachably mounted on the upper edges of the walls 18, 19, 20 and 21 and is secured thereto by fastenings 23. Each of the walls 17—22 is composed of three plies including an intermediate ply 24 of heat insulating material, for a purpose which will hereinafter become apparent, and as best illustrated in Figures 4 and 8.

The side walls 18 and 19 have downwardly extending transversely aligned bearing portions 25 through which the end portions of an axle 26 extend. Ground engaging wheels 27 are journaled on the axle 26 inwardly of and adjacent each of the bearing portions 25, as best illustrated in Figure 5. The axle 26 is spaced from the ends of the body 16 and the preponderance of the weight of the machine 15 is disposed forwardly of said axle, as will hereinafter become apparent. As best seen in Figure 4, the bottom 17 has an arch portion 28 extending from side-to-side thereof and which is disposed directly over the axle 26 to afford clearance of the wheels 27 and for an additional function, hereinafter to be described. The front wall 20 terminates above and spaced from the forward end of the body 16 to provide an entrance opening 29. The bottom 17 has its rear end terminating forwardly with respect to the bottom edge of the rear wall 21 to form a downwardly opening outlet opening 30 of the machine. The bottom 17 has a baffle or deflector portion 31 extending upwardly and forwardly from its rear end and which terminates a short distance above the level of said bottom.

A scoop blade 32 includes a bottom 33 which extends downwardly and forwardly from the forward end of the bottom 17 and which has side walls 34 which are secured to the side edges of the front wall 20 and which have downwardly and forwardly inclined front edges. A tongue 35 includes transversely spaced substantially parallel rear portions 36 which are secured to the forward ends of the side walls 18 and 19, each by a plurality of fastenings 37, for rigidly connecting said tongue to the body 16. The tongue 35 includes portions 38 which extend forwardly in converging relation to one another from the portions 36 and which merge with one another and with the rear end of a forward tongue portion 39. The tongue 35 is disposed in a plane substantially parallel to the plane of the bottom 17 and top wall 22, as seen in Figures 1, 3 and 4, and above the level of the upper end of the scoop 32.

A segment shaped hopper section 40 includes corresponding segment shaped side walls 41 and a front wall 42 which is disposed between and secured to or formed integral with the wider ends of said side walls 41. Bearing arms 43 are fixed to and extend forwardly from the side walls 18 and 19, beneath and adjacent the rear tongue portions 36, and have forward ends which are disposed forwardly of the upper portions of the side walls 34 of the scoop. The restricted ends of the walls 41 are pivotally connected to the forward ends of the bearing arms 43 by pivot pins 44. The front wall 42 of the scoop section has a bottom portion 42′ which extends below the bottom edges of the walls 41 and which is of a width somewhat less than the spacing between said walls 41 and the spacing between the walls 34. The walls 41 are spaced apart a distance corresponding to the spacing between the walls 34 and the bottom edges thereof are adapted to rest upon the front edges of the walls 34, in the operative position of the hopper section 40, as illustrated in Figure 4, in which position the bottom wall portion 42 fits snugly between the scoop walls 34 and bears against the scoop bottom 33. However, in the normal position of operation of the machine 15, the hopper section 40 is disposed in a raised substantially inoperative position, as illustrated in full lines in Figures 1 and 3 and in dotted lines in Figure 4. An eye or loop 45 is fixed to and depends from the rear end of the tongue portion 39 and is detachably engaged by a hook 45' which is pivotally connected to the upper end of the front wall 42 for supporting the hopper section 40 in its raised position out of engagement with the scoop 32.

As best seen in Figure 4, an agitator 46 is supported by and mounted in the scoop 32, in front of and adjacent the inlet opening 29 and three agitators 47, 48 and 49 are mounted within the body 16. The agitator 47 is disposed adjacent the inlet opening 29, the agitator 48 is disposed above and adjacent the rear part of the arch 28 and the agitator 49 is disposed above the outlet 30, between the deflector 31 and rear wall 21. Each of the agitators 46—49 comprises a shaft 50 having a hub 51 fixed thereto. A plurality of rigid spikes or tines 52 are fixed to and extend radially from the hub 51 of each agitator. The shaft 50 of the agitator 46 extends through and is journaled in the walls 34 and the hub and tines of said agitator are disposed within the scoop 32 between said walls 34. The shafts 50 of the agitators 47, 48 and 49 extend through and are journaled in the side walls 18 and 19 and the hubs 51 and tines 52 of said agitators are disposed for rotation within the body 16. Each agitator also includes a belt pulley 53, which belt pulleys are connected to corresponding ends of the shafts 50 thereof and are spaced outwardly with respect to the side 19 of the body 16, as best seen in Figure 2.

A power source 54, such as a gasoline engine, is fixed to and supported by a bracket 55 which is secured to and extends outwardly from the side wall 19, and a fuel tank 56 is fixed to and supported by a bracket 57 which is also secured to and extends outwardly from the wall 19. Fuel is supplied to the power source 54 from the tank 56 through a conduit 58, as seen in Figures 1 and 2. The power source 54 has an outwardly extending rotary driven shaft 59 to which is secured a pulley 60. An endless crossed belt 61 forms a driving connection between the pulley 60 and the pulley 53 of the agitator 47 and an endless belt 62 forms a driving connection between the pulley 53 of the agitator 47 and the pulley 53 of the agitator 46, so that said agitators are driven in the opposite direction to the direction of rotation of the drive shaft 59 and pulley 60.

The body 16 contains two upwardly and rearwardly inclined driven endless conveyors 63 and 64. Each of said endless conveyors includes two shafts 65 each of which extends through and is journaled in the side walls 18 and 19. Each of the shafts 65 has at least two pulleys 66 fixed to the part thereof which is disposed within the body 16 and each of which pulleys has rounded teeth or projections on the periphery thereof. An endless flexible fabric strip 68 is trained over the pulleys 66 of the two shafts 65. The exterior of the tape 68 is covered with slats 69 which extend transversely thereof and each of which is suitably secured to the strip 68 along the medial portion thereof. A cleat 70 is secured to the outer side of each slat 69 and extends from end-to-end thereof. Said cleats and the slats 69 are formed of a fireproof material. Each endless conveyor 63 also includes a rigid plate 71 which is disposed between the flights thereof and which is secured to the side walls 18 and 19. The plates 71 extend to adjacent the shafts 65 and have notches 72 in the ends thereof for accommodating the pulleys 66, as best seen in Figure 4. The ends of the upper shafts 65 of the two endless conveyors 63 and 64, which project outwardly from the side wall 19, have belt pulleys 73 fixed thereto, an endless belt 74 forms a drive from the pulley 60 to the pulley 73 of the front conveyor 63 for driving said pulley 73 in the same direction as the pulley 60. A belt 75 provides a driving connection from the pulley 73 of the conveyor 63 to the pulley 53 of the agitator 48, so that said agitator turns in the same direction as the pulley of said conveyor. A crossed endless belt 76 forms a driving connection from the pulley of the agitator 48 to the pulley of the agitator 49 for driving the agitator 49 in the opposite direction from that of the agitator 48. A crossed endless belt 77 forms a driving connection from the pulley of the agitator 49 to the pulley 73 of the rear endless conveyor 64. The direction of rotation of each of the pulleys and the endless conveyors of which the pulleys 73 form a part and the agitators of which the pulleys 53 form a part is indicated by the arrows 78 in Figures 3 and 4.

The lower end of the forward conveyor 63 is disposed above and adjacent the bottom 17 and between the agitator 47 and the forward part of the arch 28, and the upper end of said conveyor 63 is disposed beneath and adjacent the top wall 22 and above and spaced from the agitator 48. The lower end of the rear conveyor 64 is disposed between the agitator 48 and deflector 31 and above and adjacent the bottom 17, and the upper end of said conveyor 64 is disposed adjacent to but spaced from the upper rear corner of the body 16 and above and spaced from the agitator 49, as seen in Figure 4.

Each of the side walls 18 and 19 has three torches 79 mounted in and extending therethrough. The torches 79 of the two side walls are disposed substantially in alignment with one another. Each wall has a torch disposed forwardly of the front conveyor 63, a torch disposed between the conveyors 63 and 64, and a torch disposed behind the rear conveyor 64. As best seen in Figures 9 and 10, each torch comprises a sleeve 80 which extends through and is mounted in an opening 81 of the wall 18 or 19. A branch tube 82 extends centrally through each sleeve 80 and has an inner discharge end or nozzle 83, located adjacent the inner end of the sleeve 80. The tube 82 extends through and is supported by a wall 84 of the sleeve 80 and which is disposed adjacent the outer end thereof, for supporting the tube substantially axially of the sleeve. The wall 84 has apertures 85 which surround and are spaced from the tube 82.

A bracket 86 is fixed to and projects outwardly from each wall 18 and 19, and each bracket 86 supports a fuel tank 87. A conduit system 88 leads from each fuel tank 87 and connects with the three branch tubes 82, which extend outwardly from the same wall 18 or 19, for supplying fuel to the three torches 79 of said wall. When the torches are ignited and fuel is being discharged from the nozzles 83 thereof to mix with air entering through the apertures 85, a jet-type flame 89 will be projected from each torch 79 at least halfway across the interior of the body 16, for a purpose which will hereinafter be described.

A front hanger link 90 and a rear hanger link 91 are supported by and extend downwardly from pivot pins 92, at each side of the body 16, and which pins are fixed to and extend outwardly from the sides 18 and 19. A front shaft 93 extends through and is journaled in the lower ends of the front hangers 90, and a rear shaft 94 is similarly supported and journaled by the lower ends of the rear hangers 91. Two eccentrics 95 are fixed to each shaft 93 and 94 in spaced apart relation to one another. Shoe members 96 are mounted on complementary eccentrics 95 of the two shafts 93 and 94 and are disposed in transversely spaced relation to one another. Each of said shoe members has side walls 97 provided with openings 98 in which the eccentrics thereof are journaled. Levers 99 are fixed to and project laterally from corresponding ends of the shafts 93 and 94 and are disposed outwardly with respect to adjacent hangers 90 and 91.

The levers 99 can be manually engaged for turning the shafts 93 and 94 and the eccentrics 95 for raising or lowering the shoes 96 relative to the hangers 90 and 91 and the body 16. A travel limiting link 100 is pivotally connected to and extends upwardly and rearwardly from the end portions of the shaft 93, on the outer sides of the hangers 90, each link 100 having a longitudinally elongated slot or opening 101 near its upper end which slidably and turnably engages a pin 102. The pins 102 are fixed to and project outwardly from the sides 18 and 19. As seen in Figures 1 and 3, the slot and pin connection 101—102 prevents the hangers 90 and 91 from swinging forwardly past their positions of Figures 1 and 3 and prevents any further forward movement of the shoes 96, whereas said hangers can swing upwardly and rearwardly to a limited extent from their depending substantially vertical positions for swinging the shoes 96 upwardly and rearwardly to raised positions. Thus, two means are provided for raising and lowering the shoes 96, one of which means additionally provides for forward and rearward swinging movement of the shoes, both of which move in unison. The lower end of a lever 103 is fixed to or formed integral with the upper end of the hanger 90 which is suspended from the wall 18. The lever 103 has an outwardly offset upper portion which may extend to above the top of the body 16. An actuating rod 104 is fixed to and extends forwardly from the upper end of the lever 103, and the other end thereof, not shown, may be conveniently positioned for operation by the operator of a tractor, not shown, to which the machine 15 is coupled, to effect raising and lowering of the shoes 96 by swinging movement of the hangers 90 and 91.

The forward tongue portion 39 includes a rear section 105 which is rigidly fixed to or formed integral with the tongue portions 38, and a forward section 106. Said rear section 105 has a bifurcated forward end 107 the furcations of which are horizontally spaced. A part of the forward section 106 fits loosely in the bifurcated portion 107 and a pivot pin 108, which extends through the forward part of the bifurcated portion 107, pivotally connects the forward tongue section 106 to the rear tongue section 105. The forward tongue section 106 has an arm portion 109 extending forwardly from the pivot 108 to which a coupling eye 110 is connected. The coupling eye 110 extends from the forward end of the arm 109 and is detachably coupled to a draft hitch or drawbar 111 of a draft vehicle, not shown, such as a tractor, by a coupling pin 112. The forward tongue section 106 has a rear segment portion 113 which fits swingably in the bifurcated portion 107 and which has arcuately spaced openings 114 which are spaced equal distances from the pivot 108 and each of which is movable into registration with transversely aligned openings 115, of the furcations of the bifurcated portion 107, to receive a latch pin 116 whereby the tongue sections 105 and 106 can be detachably latched rigidly to one another, as will hereinafter be more fully described.

Assuming that the pin 116 is removed from the openings 114 and 115 and that the eye 110 is coupled to the hitch 111, the machine 15 can rock relative to the draft vehicle about the axle 26. By adjustment of the shoes 96, as previously described, the depth at which the forward edge 33' of the scoop bottom 33 will operate below the ground level 117 can be regulated. In Figures 1, 3 and 4, the shoes 96 are adjusted for operation of the scoop 32 at a minimum depth and said shoes can be raised relative to the hangers and swung upwardly with said hangers to allow the scoop to operate at a greater depth. When the machine 15 is coupled to a draft vehicle the hopper section 40 is supported in a raised position as illustrated in Figures 1 and 3, in full lines, and as seen in dotted lines in Figure 4. Assuming that the torches 79 are ignited so that flames 89 are being projected across the interior of the body 16, and assuming that the power source 54 is operated for driving the various belt pulleys as seen in Figure 3, as the machine 15 is drawn through a field, the earth to the depth of the scoop edge 33' will be scooped up by the scoop 32 and directed toward the inlet 29. The machine is normally utilized after harvesting of a crop in a field so that the scooped up earth will include plant stalks and other dead vegetation as well as bugs, insects, germs and the eggs thereof contained within the soil and vegetation. As this material moves up the scoop bottom 33 it will be engaged by the tines of the agitator 46 and directed through the inlet 29 into the path of movement of the tines of the agitator 47 by which the soil will be thrown onto the upwardly and rearwardly traveling upper flight of the forward conveyor 63. A part of the soil and vegetation will also be thrown upwardly by the agitator 47 into the path of the flames from the forward torches 79. The material which is discharged from the upper end of the forward conveyor 63 will fall onto the agitator 48 and will be thrown upwardly and rearwardly thereby into the flames 89 of the intermediate torches 79 and will thereafter fall onto the upper flight of the rear conveyor 64. As the material is discharged from the upper end of the rear conveyor 64 it will fall through the flames 89 of the two rear torches 79 and onto the rear agitator 49. As most of the material will pass downwardly between the rear wall 21 and said agitator 49, the tines 52 of said agitator, traveling upwardly between its hub and the rear wall 21, will obstruct and delay movement of the material to the outlet 30 to insure that the soil is well broken up when discharged from the outlet 30 and to enable all of the eggs, bugs, insects and germs as well as the vegetation to be consumed by the flames 89, during the aforedescribed passage through the body 16 so that only finely divided soil, free from such foreign matter will be returned to the earth. All of the parts disposed within the body 16 and which are exposed to the flames 89, including the inner plies of the body walls, are formed of a fire resistant material capable of withstanding the heat within said body, which constitutes an oven.

When the machine 15 is not in operation but is being transported, the pin 116 is applied to the openings 115 and to a selected opening 114 to rigidly connect the tongue sections 105 and 106 so that the tongue 35 can be supported by the hitch 111 with the forward end of the machine 15 elevated sufficiently so that the scoop edge 33' is above the ground level 117. When the pin 116 is removed and the machine is in operation, upward movement of the rear end of the draft vehicle and its hitch 111 will not raise the scoop 32 from its digging position, since the forward tongue section 106 can rock with the hitch 111 relative to the tongue section 105 without causing any up or down movement of the section 105 or any rocking movement of the body 16.

Adjustment of the eccentrics 95 by operation of the levers 99 accomplishes a desired setting of the shoes 96. Thereafter and as operation of the machine is commenced, a forward pull is exerted on the rod 104 to effect forward swinging movement of the lever 103 to momentarily elevate the shoes 96 to allow the scoop 32 to commence digging a trench. The shoes 96 are thereafter swung downwardly and forwardly by rearward swinging movement of the lever 103 so that said shoes and the wheels 27 can travel in the trench cut by the scoop 32.

The machine 15 can also be operated as a stationary unit uncoupled from a draft vehicle. When so utilized, the hook 45' is disengaged from the eye 45 to allow the hopper section 40 to assume its full line position of Figure 4 to combine with the part of the scoop 32 disposed above the wall portion 42' to form a hopper into which the earth to be treated can be dumped. The earth and material contained therein will be conveyed from said hopper through the machine by the agitators and conveyors in the same manner as heretofore described for loosening and pulverizing the soil and for destroying foreign matter contained therein. Guide strips 41' are secured to the side walls 41 and slidably engage the side walls 34 to maintain the walls 41 coplanar with the walls 34 when the hopper section 40 is in either a raised or lowered position.

Various modifications and changes are contemplated and may be resorted to, without departing from the function or scope of the invention as hereinafter defined by the appended claims.

I claim as my invention:

1. A soil treating machine comprising an elongated body forming an oven having a forward end provided with an inlet opening, said body having a downwardly opening outlet adjacent its opposite end, driven endless conveyors supported by and operating in said body and disposed in longitudinally spaced relation to one another, each of said endless conveyors being inclined upwardly and rearwardly away from the inlet for conveying soil and foreign matter upwardly and rearwardly within said body, said endless conveyors being disposed to pick up the soil and foreign matter from adjacent the bottom of the body and to discharge said material therefrom adjacent the top of the body, a plurality of driven agitators supported by and disposed within said body for agitating the material, certain of said agitators being disposed to direct the material onto said endless conveyors, and a plurality of torches supported by and extending into the body and from which flames are projected across the body into the path of travel of the material for destroying the consumable foreign matter passing through the machine so that the soil discharged from the machine through said outlet in a loose and finely divided condition will be free of consumable matter.

2. A soil treating machine as in claim 1, a mobile support connected to and disposed beneath said body and supporting the body for rocking movement about a transverse axis thereof, a draft tongue connected to the body and extending forwardly from the forward end thereof and adapted to be coupled to a draft vehicle, and a scoop secured to the forward end of said body and extending downwardly and forwardly therefrom and disposed to scoop up and direct soil into the body through said inlet opening when the machine is moving in a forward direction.

3. A soil treating machine as in claim 2, and a rotary driven agitator disposed within said scoop for agitating and directing the soil and foreign matter contained therein through said inlet opening and into the body.

4. A soil treating machine as in claim 3, said mobile support including a single axle connected to and disposed beneath said body, crosswise thereof and spaced from the ends of the body such that the forward end of the body normally swings downwardly, a plurality of wheels journaled on said axle, hanger members swingably connected to and depending from said body, and shoes connected to said hanger members and disposed beneath the body between said wheels and the scoop for supporting the forward end of the body.

5. A soil treating machine as in claim 4, manually actuated means including eccentrics for raising and lowering said shoes relative to the hanger members and body for varying the operating depth of the scoop.

6. A soil treating machine as in claim 5, and manually actuated means to effect upward and rearward swinging movement of said shoes for adjusting the position of the shoes relative to the wheels for varying the operating depth of the scoop.

7. A soil treating machine as in claim 1, a power source supported on and disposed externally of the body, and means forming a driving connection between said power source and each of the conveyors and agitators.

8. A soil treating machine as in claim 1, at least one fuel tank supported on said body and disposed externally thereof, a conduit system for supplying fuel from said fuel tank to the torches.

9. A soil treating machine as in claim 1, an axle connected to and disposed beneath said body, crosswise thereof and rearwardly with respect to the center of gravity of the body, ground engaging wheels journaled on said axle, a draft tongue having a forward end rigidly secured to the body and extending from the forward end thereof and a forward end adapted to be detachably coupled to a draft hitch, a scoop secured to the forward end of said body and extending downwardly and forwardly therefrom and disposed to scoop up and direct soil into the body through said inlet opening when the machine is moving in a forward direction, said tongue including a joint permitting up and down swinging movement of the forward portion of said tongue relative to the rear portion thereof whereby the forward end of the body and scoop will not be lifted by upward movement of the draft hitch relative to the machine.

10. A soil treating machine as in claim 9, and means for adjustably and detachably latching said tongue ends rigidly to one another for supporting the forward end of the body and the scoop in an elevated position on the draft hitch.

11. A soil treating machine as in claim 1, a mobile support connected to and disposed beneath said body and supporting the body for rocking movement about a transverse axis thereof, a scoop secured to the forward end of said body and extending downwardly and forwardly therefrom and disposed to scoop up and direct soil into the body through said inlet opening when the machine is moving in a forward direction, a hopper section, means connecting said hopper section to the body for up and down swinging movement above said scoop, means supporting said hopper section releasably in a raised inoperative position out of engagement with said scoop, said hopper section being swingable downwardly by gravity when said means is disengaged to assume a position in engagement with the scoop for combining with the scoop to define a hopper having an open top adapted to receive soil to be processed by the machine, said inlet opening constituting the hopper outlet.

References Cited in the file of this patent

UNITED STATES PATENTS

| 1,444,794 | Kernan | Feb. 13, 1923 |
| 1,906,127 | Reishus | Apr. 25, 1933 |
| 1,930,015 | Meyer | Oct. 10, 1933 |